Feb. 16, 1965 JEAN-PIERRE VASSEUR 3,170,033

ELECTRICAL GENERATORS OF QUASI-RANDOM SYMBOLS

Filed July 27, 1961 5 Sheets-Sheet 1

Feb. 16, 1965 JEAN-PIERRE VASSEUR 3,170,033

ELECTRICAL GENERATORS OF QUASI-RANDOM SYMBOLS

Filed July 27, 1961 5 Sheets-Sheet 2

Feb. 16, 1965 JEAN-PIERRE VASSEUR 3,170,033

ELECTRICAL GENERATORS OF QUASI-RANDOM SYMBOLS

Filed July 27, 1961 5 Sheets-Sheet 4

Feb. 16, 1965 JEAN-PIERRE VASSEUR 3,170,033

ELECTRICAL GENERATORS OF QUASI-RANDOM SYMBOLS

Filed July 27, 1961 5 Sheets-Sheet 5

United States Patent Office 3,170,033
Patented Feb. 16, 1965

3,170,033
ELECTRICAL GENERATORS OF QUASI-RANDOM SYMBOLS

Jean-Pierre Vasseur, Paris, France, assignor to Compagnie Generale de Telegraphie Sans Fil, a corporation of France Filed July 27, 1961, Ser. No. 127,171
Claims priority, application France, Aug. 2, 1960, 834,731
5 Claims. (Cl. 178—22)

The present invention relates to cryptographic devices. More particularly it is an object of the invention to provide a generator of quasi-random symbols, such as a generator of a key for cryptographic devices.

A generator according to the invention, comprises a plurality of binary counters, associated with permutator electric circuits, coders, and decoders, arranged in such a manner as to obtain, at the output of the device, in as random a manner as possible, numerical symbols by means of comparatively simple circuits.

According to a particular feature of the invention, the binary digits produced by said counters are distributed in a plurality of groups, each of which is decoded, permutated and then again separately encoded before being again assembled with the others.

The invention will be best understood from the following description and appended drawing, wherein.

Figure 1A:
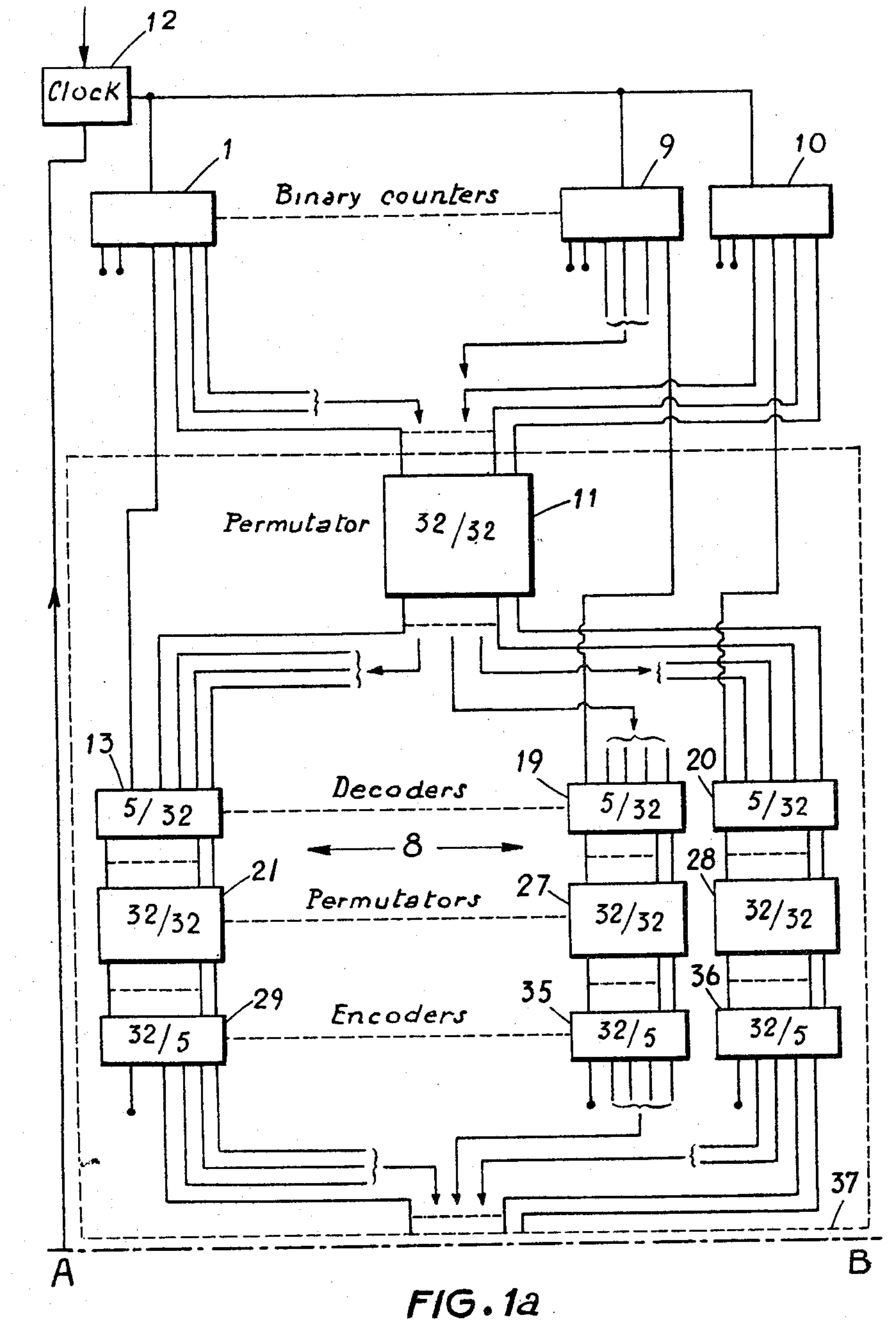
FIG. 1 is a thirty-output key generator, according to the invention.

FIG. 1 is divided in two portions 1*a* and 1*b*, which are to be juxtaposed along line AB to form FIG. 1. The key generator shown in this figure comprises ten binary counters, numbered from 1 to 10, each having six stages. The six corresponding digits are manifested on the six outputs, two of which (those corresponding to the two most significant digits) are not used, the four others being connected to a permutator 11 (except eight outputs which are directly connected to eight decoders 13 to 20). Counter 1 is arranged in such a manner that its count advances by one each time it receives a pulse delivered by a clock 12, up to the maximum count of twenty-nine, the next pulse resetting it to zero. Clock 12 may either operate by itself in a free running manner, or deliver a pulse each time it receives an external synchronizing signal.

Counters 2 to 10 respectively advance in the same manner and have maximum counts respectively equal to thirty-one, thirty-seven, forty-one, forty-three, forty-seven, fifty-three, fifty-six, fixty-nine and sixty-one.

It is seen that the maximum counts of counters 1 to 10 are the highest successive prime numbers lower than sixty-three, which is the maximum count of a six stages binary counter, and prime to each other.

Therefore, the repetition period of the thirty-two digit binary number at the input of permutator 11 is equal to the product of the ten numbers indicated above.

Permutator 11 is a network having thirty-two inputs and thirty-two outputs, arbitrarily interconnected by internal connections. The thirty-two outputs of permutator 11 are divided ino eight groups of four, each group of four outputs being connected to four of the inputs of one of the decoders 13 to 20. The fifth input to decoders 13–20 is directly connected to one of the outputs of counters 1–10.

The decoders are of a known type. They may, for example, be diode matrices, with $n$ inputs and $2^n$ outputs (for decoders 13 to 20 $n$ is equal to 5) such that when $n$ signals respectively representing the $n$ digits or bits of a binary number are respectively applied to the corresponding inputs of the decoder, the latter delivers a signal on its output, the number of which corresponds to a number defined in binary code by the input signals.

It will be apparent that, generally, the inputs of any one of the decoders is derived from several counters, so that the five-digit input binary number of each decoder has a very long repetition period.

The signal appearing on one of the thirty-two outputs of one of the decoders 13 to 20 is transmitted to that among the permutators 21 to 28 which has its inputs respectively coupled to the outputs of the decoder concerned. The latter are connected to encoders 29 to 36. These are known devices having $2^n$ inputs and $n$ outputs which operate in a manner which is the reverse of that in which decoders 13 to 20 operate. They convert a signal existing on one of their inputs into a set of binary signals appearing on their outputs and which represent the serial number of the input wire to which the signal has been applied.

Each of the encoders 29 to 36 possesses five outputs, one of which is unconnected. The four others are connected to the inputs of a permutator 38, similar to permutator 11.

Figure 1B:
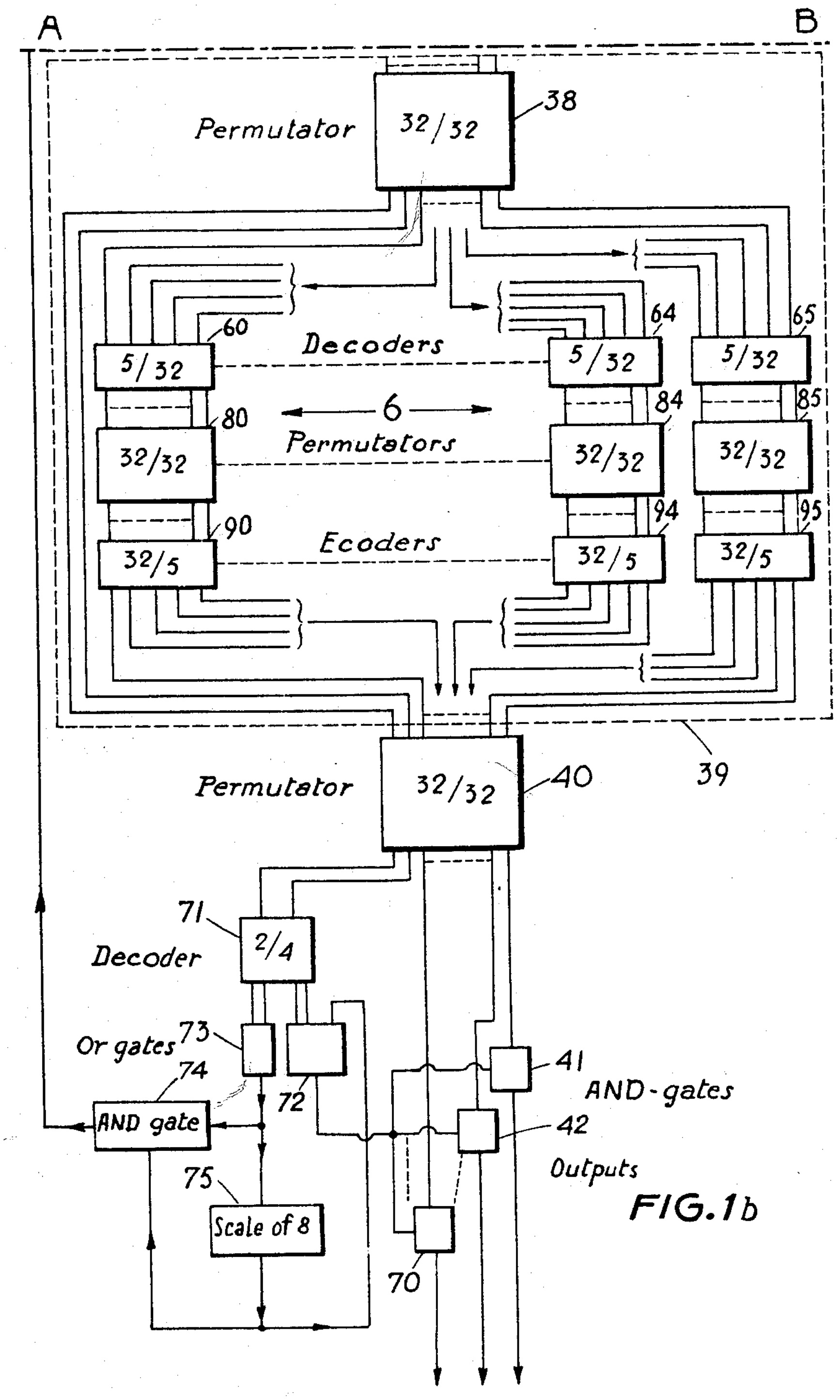

The permutator 38 is part of a permutation, encoding and decoding unit 39, shown in dotted lines in FIG. 1*b*.

Unit 39 is similar to unit 37 just described, built up by the permutators, encoders and decoders shown in FIG. 1*a*, except that it contains only six decoder-permutator-encoder stages, whereas unit 37 contains eight thereof.

While in FIG. 1 only two units 37 and 38 have been shown, it is to be understood that a plurality thereof may be cascade connected.

Out of the thirty-two outputs of permutator 38 two are connected directly to two inputs of permutator 40, which is similar to permutator 11, and the thirty remaining outputs are connected to the inputs of permutator 40 through decoders 60 to 65, permutators 80 to 85 and encoders 90 to 95 in the same manner as in FIG. 1*a*; thirty of the outputs of permutator 40 by means of AND-gates 41 to 70, to the outputs of the apparatus.

The two remaining outputs of permutator 40 are connected to a decoder 71 having four outputs.

The four outputs of decoder 71 are connected by pairs, respectively, to two OR-gates 72 and 73.

The output of OR-gate 72 is connected to one input of each of the AND-gates 41 to 70, whereas the output of the OR-gate 73 is connected to an AND-gate 74 and to a scale-of-eight device 75. The output of the latter is connected to a third input of the OR-gate 72 and to the control input of AND-gate 74.

The output of AND-gate 74 is connected to the triggering input of clock 12.

It will be apparent that when a signal occurs at one of the two outputs of decoder 71 which are connected to the OR-gate 72, this signal is transmitted to the control inputs of the AND-gates 41 to 70, at the other input of which is simultaneously applied a signal derived from permutator 40. These latter signals are thus applied to the outputs of the system. On the contrary, if a signal occurs at one of the two outputs of decoder 71, which are connected to the OR-gate 73, there are no signals at the outputs of the system and a signal is transmitted to clock 12 through the normally opened AND-gate 74 to initiate a new operating cycle of counters 1 to 10. Thus, the system is re-cycled as long as the new cycles give rise to a signal at one of the inputs of the OR-gate 73. However, the number of the new cycles thus initiated is limited to eight by the scale-of-eight device 75 which, once eight successive signals have been applied to its input, provides a blocking signal which blocks AND-gate 74. The same signal, on the other hand, opens the OR-gate 72, thus opening the AND-gates 41 to 70.

The various elements of the system described are either well known or entirely within the reach of those skilled in the art. It should, however, be mentioned that, according to a particular feature of the invention, the various permutators all have the same number of inputs and outputs and that each permutator is provided with plugs for establishing different connections between the inputs and the outputs, thus instantly modifying the permutations.

It is thus apparent that owing to these essential features of the invention, there are produced in a quasi-random fashion at the outputs of the system, thirty digits by means of a comparatively simple arrangement.

The device thus comprises an external key which is formed by the relative initial phase of counters 1 to 10, and an internal key, formed by the selection of the permutators.

In certain cases, in particular when it is desired to effect a coding by addition without carry-over of the figures in clear and key figures, the key generator must produce a number of output digits which is much lower than thirty, for example five.

Figure 2:
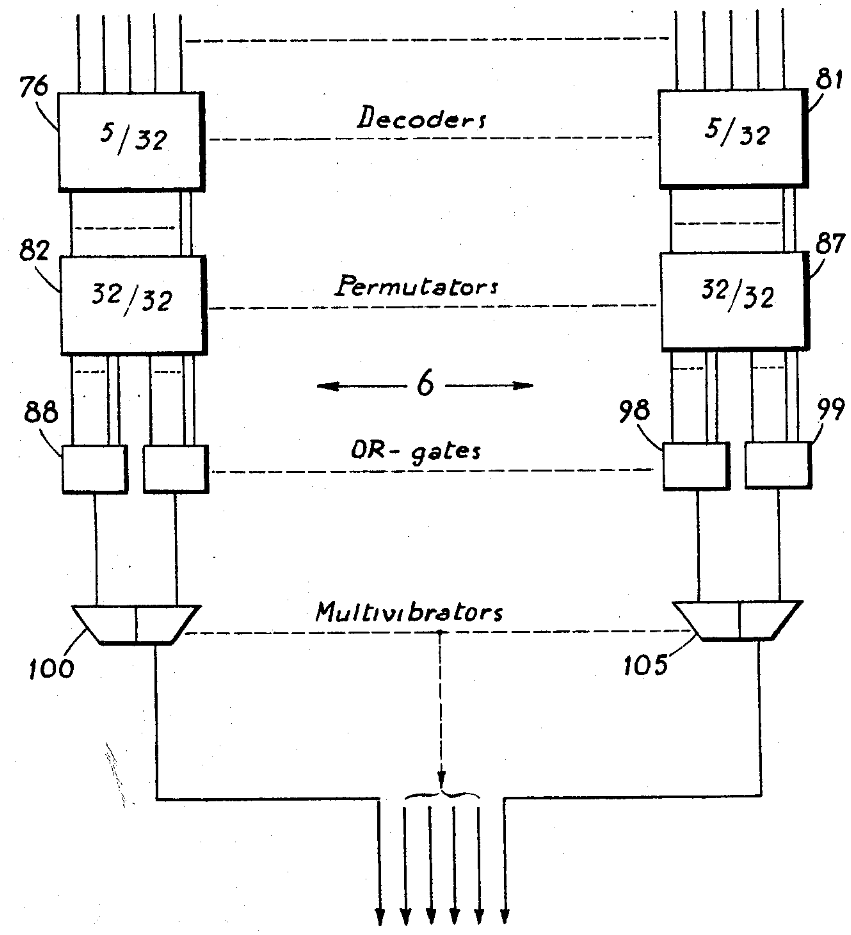
FIG. 2 is a device for transforming the thirty digits produced by the generator shown in FIG. 1 into six quasi-random digits.

The output of the device in FIG. 1 is then connected to a device of the type shown in FIG. 2.

This device comprises, in the non-limitative example shown, six decoders 76–81 having each five inputs which are connected to five of the outputs of the system shown in FIG. 1.

The thirty-two outputs of each decoder are connected to the thirty-two inputs of one the permutators 82 to 87. The outputs of each of the permutators are divided into two groups of sixteen, each connected to the input of one of the OR-gates 88 to 99.

Each pair of two adjacent OR-gates is connected to one of the bistable multivibrators 100 to 105. Each one of these multivibrators is set in its 0 state or in its 1 state according to whether the signal at the output of the corresponding permutator occurs in one or the other of the two groups of sixteen outputs thereof.

The six outputs of the device are collected on the six outputs of multivibrators 100 to 105.

It is apparent that the number of the thirty digits assemblies leading to a six-digit output is very high.

Figure 3A:
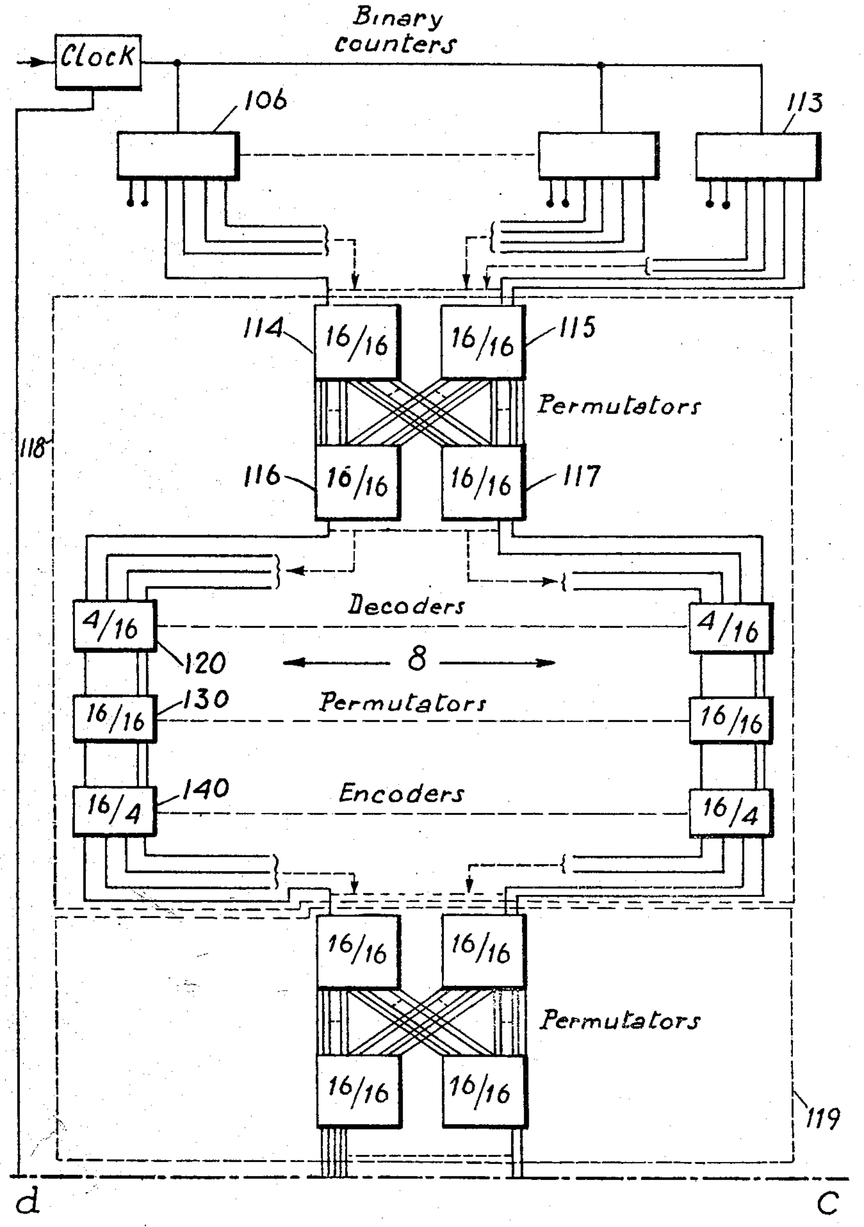
FIG. 3 is a seven-output key generator, incorporating a device of the type shown in FIG. 2 into a device of the type shown in FIG. 1.
Figure 3B:
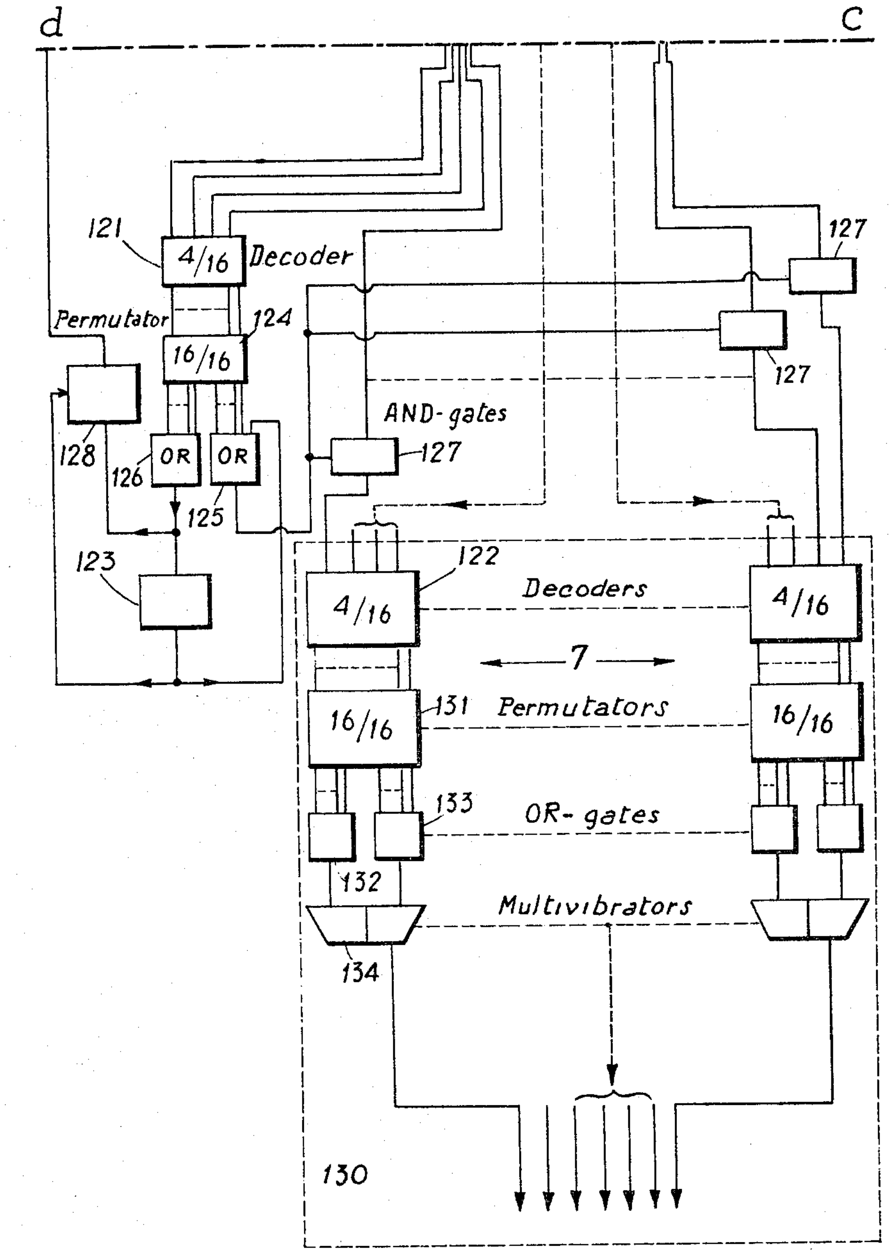

In FIGS. 3*a* and 3*b* which are to be joined to each other along line *cd*, there is shown a modified embodiment of the system illustrated in FIGS. 1 and 2. The circuit of this alternative embodiment is to a substantial extent similar to that in FIGS. 1 and 2, and accordingly need not be described here in detail.

There are eight counters 106 to 113 in the system of FIGS. 3*a* and 3*b*, each having six outputs. Their maximum counts are respectively equal to thirty-seven, fourty-one, forty-three, forty-seven, fifty-three, fifty-nine, sixty-one and sixty-seven.

According to a particular feature of this modification, the permutation of thirty-two output digits of counters 106 to 113 is effected by means of four permutators 114 to 117, each having sixteen inputs and outputs. The outputs of each of the permutators 114 and 115 and the inputs of each of the permutators 116 and 117 are divided into two groups of eight, the connections being crossed, as shown.

Unit 118 is built up from the above permutators 114 and 117 having sixteen inputs and outputs, eight further permutators 130, each having sixteen inputs and sixteen outputs, eight decoders 120, each having four inputs and sixteen outputs and eight encoders 140 having sixteen inputs and four outputs, the connection and the operation of the assembly being the same as in FIG. 1.

The signals from unit 118 are applied to a permutator 119 having four permutators with sixteen inputs and outputs, interconnected in the same way as permutators 114 to 117.

Of the thirty-two signals derived from permutator 119, four are applied to the respective inputs of a decoder 121 (FIG. 3*b*) having sixteen outputs, which is followed by a permutator 124 with sixteen inputs and outputs, the latter being divided into two groups respectively connected to OR-gates 125 and 126. The output of OR-gate 125 controls the twenty-eight AND-gates 127, respectively connected in series to the twenty-eight outputs of unit 119.

The operation of the device is similar to that of FIG. 1, i.e. the AND-gates are unblocked when a signal occurs at one of the inputs of OR-gate 125. When the signal appears at one of the inputs of OR-gate 126, the AND-gates 127 remain blocked and the cycle of the system is repeated.

The re-cycling is however limited to eight times, as in the case of FIG. 1*b*, by means of the scale-of-eight device 123 and AND-gate 128.

The twenty-eight digits at the output of AND-gates 127 may be used as such or reduced to a lower number as shown in FIG. 2. This last operation is performed by block 130 where the twenty-eight digits are assembled into seven groups of four digits, each group being decoded by decoder 122 and permutated by permutators 131. The outputs of permutators 131 are divided into two groups of eight, connected to the OR-gates 132, 133, respectively, each pair of adjacent gates feeding a bistable multivibrator 134, which is set into its "1" or "0" state, according to whether the input signal occurs at the input of gate 132 or gate 133.

The seven digits are finally collected at the outputs of the seven multivibrators 134.

It is to be understood that many variations and modifications may be brought to the systems described, without departing from the spirit of the invention. For example, it is possible to control the advances of certain of the counters 1 through 10 or 106 through 113 by means of certain output digits or combinations thereof.

Also, more or less than one output digit of counter 1 to 10 may be directly fed to decoders 13 to 20, i.e. without passing through permutator 11.

What is claimed is:

1. A generator of quasi-random symbols represented by coded combinations of signals comprising, in combination; a clock pulse generator including an output; a plurality of multistage binary counters; each of said multistage binary counters including an input and a plurality of outputs for transmitting signals; means for connecting the inputs of said multistage binary counters to the output of said clock pulse generator; a plurality of decoder means, each of said decoder means including a plurality of inputs and outputs for transmitting signals from different ones of its outputs in response to different coded combinations of signals received at its inputs; means for connecting selected outputs of said multistage binary counters to the inputs of said decoder means; a plurality of permutation means, each of said permutation means including a plurality of inputs and outputs for permutationally transferring signals received at is inputs to its outputs; means for connecting the inputs of each of said permutation means to the outputs of each of said decoder means respectively; a plurality of encoder means, each of said encoder means including a plurality of inputs and outputs for transmitting different coded combinations of signals from its outputs in responses to signals received at different ones of its inputs; and means for connecting the outputs of each of said permutation means to the inputs of said encoder means respectively, the signals at the outputs of said encoder means representing said symbols.

2. The generator of claim 1 wherein the maximum counts of each of said multistage binary counter are primes and different from each other.

3. The generator of claim 1 further comprising: a plurality of second decoder means, each of said second decoder means including a plurality of inputs and outputs for transmitting signals from different ones of its outputs in response to different coded combinations of signals received at its inputs; means for connecting the inputs of said second decoder means to outputs of said encoder means wherein the outputs of one of said encoder means are connected to the inputs of one of said second decoder means respectively; a plurality of second permutation means, each of said second permutation means including a plurality of inputs and outputs for permutationally transferring signals received at its inputs to its outputs, the outputs of each second permutation means being divided into first and second groups; means for connecting the outputs of said second decoder means to the inputs of said second permutation means wherein the outputs of one of said second decoder means are connected to the inputs of one of said second permutation means respectively, pluralities of pairs of OR-gates, each of said OR-gates including a plurality of inputs and one output; means for connecting the first group of outputs of each of said second permutation means to the inputs of one of the OR-gates in each of said pairs of OR-gates wherein the first group of outputs of one of said second permutation means are connected to the inputs of one of said OR-gates respectively; means for connecting the second group of outputs of each of said second permutation means to the inputs of the other OR-gates in each of said pairs of OR-gates wherein the second group of outputs of one of said second permutation means are connected to the inputs of one of said other OR-gates respectively; a plurality of bistable signal generators each having first and second inputs and an output; means for connecting the first inputs of said bistable signal generators to the outputs of said one OR-gates of said pairs of OR-gates wherein the first input of one of said bistable signal generators is connected to the output of one of said one OR-gates respectively; and means for connecting the second inputs of said bistable signal generators to the outputs of said other OR-gates of said pairs of OR-gates wherein the second input of one of said bistable signal generators is connected to the output of one of said other OR-gates respectively, the signals at the outputs of said bistable signal generators representing said symbols.

4. A generator of quasi-random symbols represented by coded combinations of signals comprising, in combination; a clock pulse generator including an output; a plurality of multistage binary counters, each of said multistage binary counters including an input and a plurality of outputs for transmitting signals; means for connecting the inputs of said multistage binary counters to the output of said clock pulse generator; a plurality of first decoder means, each of said first decoder means including a plurality of inputs and outputs for transmittings signals from different ones of its outputs in response to different coded combinations of signals received at its inputs; means for connecting selected outputs of said multistage binary counters to the inputs of said first decoder means; a plurality of first permutation means, each of said first permutation means including a plurality of inputs and outputs for permutationally transferring signals received at its inputs to its outputs; means for connecting the inputs of each of said second permutation means to the outputs of each of said first decoder means respectively; a plurality of first encoder means, each of said first encoder means including a plurality of inputs and outputs for transmitting different coded combinations of signals from its outputs in response to signals received at different ones of its inputs; means for connecting the outputs of each of said first permutation means to the inputs of said first encoder means respectively; a plurality of second decoder means, each of said second decoder means including a plurality of inputs and outputs for transmitting signals from different ones of its outputs in response to different coded combinations of signals received at its inputs; means for connecting selected outputs of said first encoder means to the inputs of said second decoder means, a plurality of second permutation means, each of said second permutation means including a plurality of inputs and outputs for permutationally transferring signals received at its inputs to its outputs; means for connecting the inputs of each of said second permutation means to the outputs of each of said second decoder means respectively; a plurality of second encoder means, each of said second encoder means including a plurality of inputs and outputs for transmitting different coded combinations of signals from its outputs in response to signals received at different ones of its inputs; and means for connecting the outputs of each of said second permutation means to the inputs of said second encoder means respectively, the signals at the outputs of said second encoder means representing said symbols.

5. A generator of quasi-random symbols comprising, in combination; a clock pulse generator including an output and a control input; a plurality of multistage binary counters, each of said multistage binary counters including an input and a plurality of outputs, means for connecting the inputs of said multistage binary counters to the output of said clock pulse generator; a plurality of decoder means, each of said decoder means including a plurality of inputs and outputs for transmitting signals from different ones of its outputs in response to different coded combinations of signals received at its inputs; means for connecting selected outputs of said multistage binary counters to the inputs of said decoder means; a plurality of permutation means, each of said permutation means including a plurality of inputs and outputs for permutationally transferring signals received at its inputs to its outputs; means for connecting the inputs of each of said permutation means to the outputs of each of said decoder means respectively; a plurality of encoder means each of said encoder means including a plurality of inputs and outputs for transmitting different coded combinations of signals from its outputs in response to signals received at different ones of its inputs; means for connecting the outputs of each of said permutation means to the inputs of said encoder means respectively, a permutator means including a plurality of outputs arranged in first and second groups and a plurality of inputs for permutationally transferring signals received at its inputs to its outputs; a plurality of AND-gates each including first and second groups of inputs, the inputs of said first group being respectively connected to each of the outputs of said second group of outputs of said permutator; a decoder having inputs connected to said first group of outputs of said permutator, and outputs; a plurality of OR-gates including first and second groups of inputs, the inputs of said first group being connected to the outputs of said decoder, and first and second groups of outputs, said first group of outputs being connected to the second group of inputs of said AND-gates; a gate including a first input connected to said second group of outputs of said OR-gates, an output connected to the control input of said clock generator, and a second input; and scaling means including an input connected to said second group of outputs of said OR-gates and an output connected to the second group of inputs of said OR-gates and to the second input of said gate, said scaling means transmitting a signal from its output for each given number of signals received at its input.

References Cited by the Examiner

UNITED STATES PATENTS

| | | | |
|---|---|---|---|
| 2,539,014 | 1/51 | Frantz | 178—22 |
| 2,949,501 | 8/60 | Hell | 178—22 |
| 3,038,028 | 6/62 | Henze | 178—22 |

ROBERT H. ROSE, *Primary Examiner.*

WALTER L. LYNDE, *Examiner.*